(12) United States Patent
Hessling-Von Heimendahl et al.

(10) Patent No.: US 11,565,828 B2
(45) Date of Patent: Jan. 31, 2023

(54) EXTERIOR AIRCRAFT LIGHT COVER, EXTERIOR AIRCRAFT LIGHT COMPRISING THE SAME, AND METHOD OF UPGRADING OR MAINTAINING AN EXTERIOR AIRCRAFT LIGHT

(71) Applicant: Goodrich Lighting Systems GmbH, Lippstadt (DE)

(72) Inventors: Andre Hessling-Von Heimendahl, Koblenz (DE); Jens Leuschner, Moehnesee (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 17/376,214

(22) Filed: Jul. 15, 2021

(65) Prior Publication Data

US 2022/0017236 A1 Jan. 20, 2022

(30) Foreign Application Priority Data

Jul. 17, 2020 (EP) .................................... 20186576

(51) Int. Cl.
| | |
|---|---|
| *B64D 47/02* | (2006.01) |
| *B64F 5/40* | (2017.01) |
| *F21S 9/03* | (2006.01) |
| *F21V 23/00* | (2015.01) |
| *B64D 47/06* | (2006.01) |
| *B64D 47/04* | (2006.01) |

(52) U.S. Cl.
CPC ............. *B64D 47/02* (2013.01); *B64D 47/06* (2013.01); *B64F 5/40* (2017.01); *F21S 9/037* (2013.01); *F21V 23/003* (2013.01); *B64D 47/04* (2013.01); *B64D 2203/00* (2013.01)

(58) Field of Classification Search
CPC ......... F21S 9/037; B64D 47/02; B64D 47/04; B64D 47/06; B64D 2203/00; F21V 23/003; B64F 5/40
See application file for complete search history.

(56) References Cited

U.S. PATENT DOCUMENTS

| | | | |
|---|---|---|---|
| 6,431,728 B1 * | 8/2002 | Fredericks | ........... B60Q 1/2696 362/240 |
| 6,637,916 B2 | 10/2003 | Mullner | |
| 9,010,959 B2 | 4/2015 | Edelson et al. | |

(Continued)

OTHER PUBLICATIONS

Extended European Search Report for International Application No. 20186576.3 dated Jan. 11, 2021, 7 pages.

*Primary Examiner* — Alan B Cariaso
(74) *Attorney, Agent, or Firm* — Cantor Colburn LLP

(57) ABSTRACT

An exterior aircraft light cover with integrated illumination includes a mounting portion, configured to be mounted to an exterior aircraft light housing; a light transmissive pane, supported by the mounting portion. The mounting portion and the light transmissive pane are configured to jointly close the exterior aircraft light housing. The cover also includes at least one photovoltaic device, which is configured for generating electric energy when illuminated; at least one electric storage device, which is configured for storing the electric energy generated by the at least one photovoltaic device; and at least one ancillary light source, which is operable with electric energy supplied by at least one of the at least one photovoltaic device and the at least one electric storage device.

17 Claims, 4 Drawing Sheets

(56) References Cited

U.S. PATENT DOCUMENTS

| | | |
|---|---|---|
| 9,963,245 B2 | 5/2018 | Jha et al. |
| 10,189,579 B2 | 1/2019 | Hessling-Von Heimendahl |
| 10,253,466 B2 | 4/2019 | Messiou et al. |
| 2012/0201041 A1 | 8/2012 | Gergets et al. |
| 2019/0241278 A1* | 8/2019 | Khawam ................ F21S 10/06 |

* cited by examiner

EXTERIOR AIRCRAFT LIGHT COVER, EXTERIOR AIRCRAFT LIGHT COMPRISING THE SAME, AND METHOD OF UPGRADING OR MAINTAINING AN EXTERIOR AIRCRAFT LIGHT

CROSS-REFERENCE TO RELATED APPLICATIONS

This application claims priority to European Patent Application No. 20186576.3 filed Jul. 17, 2020, the entire contents of which is incorporated herein by reference.

TECHNICAL FIELD

The present invention relates to the field of aircraft lighting, in particular to a cover for an exterior aircraft light ("exterior aircraft light cover") and to an exterior aircraft light comprising such a cover. The invention further relates to an aircraft comprising such an exterior aircraft light and to a method of upgrading or maintaining an exterior aircraft light by replacing its exterior aircraft light cover.

Almost all aircraft are equipped with exterior aircraft lights. In particular, large passenger air planes have a wide variety of exterior aircraft lights. Examples of such lighting devices include take-off and/or landing lights, taxi lights, navigation lights and anti-collision lights.

It would be beneficial to improve the visibility of the exterior aircraft lights, in particular when the aircraft is located on the ground, for example for helping ground personnel to identify the aircraft and/or different portions of the aircraft unambiguously and more easily.

Exemplary embodiments of the invention include an exterior aircraft light cover, which is configured to be mounted to an exterior aircraft light, comprising: a mounting portion, configured to be mounted to a housing of an exterior aircraft light ("exterior aircraft light housing"); a light transmissive pane, supported by the mounting portion, wherein the mounting portion and the light transmissive pane are configured to jointly close the exterior aircraft light housing; at least one photovoltaic device, which is configured for generating electric energy when illuminated; at least one electric storage device, which is configured for storing at least a portion of the electric energy generated by the at least one photovoltaic device; and at least one light source, which is operable with electric energy supplied by at least one of the at least one photovoltaic device and the at least one electric storage device.

When an exterior aircraft light cover according to an exemplary embodiment of the invention is mounted to a housing of an exterior aircraft light, the visibility and identifiability of the exterior aircraft light may be improved, in particular in a dark environment, by operating the at least one light source of the exterior aircraft light cover. This helps ground personnel to identify the aircraft and/or the exterior aircraft light.

The at least one light source of the exterior aircraft light cover is an ancillary light source, i.e. a light source which is provided in addition to at least one targeted light source of the exterior aircraft light, providing the intended functionality of the exterior aircraft light. In other words, the at least one ancillary light source of the exterior aircraft light cover is not identical with the at least one targeted light source, providing the intended functionality of the exterior aircraft light.

Due to the at least one photovoltaic device and the at least one electric storage device, an exterior aircraft light cover according to an exemplary embodiment of the invention is operable without establishing any electric connections between the exterior aircraft light cover and the electric system of the aircraft. In consequence, a conventional exterior aircraft light cover, i.e. a light cover which covers the light sources of the exterior aircraft light device, but which does not comprise any ancillary light sources, may be replaced easily by an exterior aircraft light cover according to an exemplary embodiment of the invention without intervening with the electric system of the aircraft. As an exterior aircraft light cover according to an exemplary embodiment of the invention does not intervene with the electric system of the aircraft, the process of certifying such an exterior aircraft light cover for use in commercial aviation is considerably simplified, when compared to the process of certifying a component which does intervene with the electric system of the aircraft.

In an exterior aircraft light cover according to an exemplary embodiment of the invention, the at least one electric storage device is repeatedly recharged with electric energy generated by the at least one photovoltaic device. In consequence, the at least one light source of the exterior aircraft light cover may be operated with high reliability and the exterior aircraft light cover requires only little maintenance.

In an embodiment, the at least one ancillary light source of the exterior aircraft light cover is at least one LED or it may comprise at least one LED. LEDs provide reliable light sources, which may be operated with high efficiency, at comparable low costs. LEDs emitting light of basically any desired color used in aviation are commercially available.

In an embodiment, the exterior aircraft light cover comprises a support portion, which is configured for supporting the light transmissive pane. The support portion may in particular be provided as a retainer or frame extending along the outer periphery of the light transmissive pane. Such a support portion provides a solid support of the light transmissive pane. It may also protect the outer periphery of the light transmissive pane from being damaged by mechanical impact.

In an embodiment, the mounting portion is configured as a support portion for supporting the light transmissive pane. Integrating the support portion, supporting the light transmissive pane, with the mounting portion provides a compact exterior aircraft light cover, which may be produced at low costs.

In an embodiment, the light transmissive pane is configured to allow light from within the exterior aircraft light, in particular light generated by at least one targeted light source of the exterior aircraft light, to pass through the light transmissive pane.

In an embodiment, the light transmissive pane may be at least partially transparent. The light transmissive pane may comprise at least one light transmissive portion and at least one opaque portion, which is not light transmissive. A combination of light transmissive and opaque portions of the light transmissive pane may be employed for shaping the light output emitted by the exterior aircraft light according to the actual needs.

In an alternative embodiment, the light transmissive pane may be light transmissive substantially across its whole spatial extension, allowing substantially all light emitted by the at least one targeted light source to pass through the light transmissive pane. In such a configuration, the light emitted by the at least one targeted light source is used very efficiently, as basically no light emitted by the at least one targeted light source is blocked by opaque portions of the light transmissive pane.

In an embodiment, the light transmissive pane comprises a plurality of light transmissive portions having different colors. Such a light transmissive pane allows the exterior aircraft light to emit a light pattern including light of different colors, even if it does not comprise multi-colored targeted light sources.

In an embodiment, the at least one photovoltaic device is arranged in a position in which it is, in operation, illuminated by light which is emitted by the at least one targeted light source of the exterior aircraft light and reflected by the light transmissive pane. The light emitted by the targeted light sources of the exterior aircraft light may in particular reflected towards the at least one photovoltaic device by Fresnel reflection.

Such a configuration allows generating electric power, used for operating the exterior aircraft light cover, from light emitted by the targeted light sources when the exterior aircraft light is operated. In such a configuration, the generation of electric power does not depend on the presence of external ambient light, such as sun light. In consequence, electric power for operating the at least one light source of the exterior aircraft light cover is generated even at night, when no external ambient light is present.

In an embodiment, the at least one photovoltaic device comprises at least one solar cell. Solar cells provide highly efficient photovoltaic devices. In order to enhance the efficiency even further, the photovoltaic devices/solar cells may be optimized to the wavelengths/spectrum of the light emitted by the at least one targeted light source.

In an embodiment, the at least one electric storage device is electrically coupled to the at least one photovoltaic device and to the at least one ancillary light source. In such a configuration, at least a portion of the electric energy generated by the at least one photovoltaic device may be supplied to and stored within the at least one electric storage device. The electric energy stored within the at least one electric storage device may be supplied to the at least one ancillary light source for operating said ancillary light source. Such a configuration allows operating the at least one ancillary light source even in situations in which no electric power is generated by the at least one photovoltaic device since the at least one photovoltaic device is temporarily not illuminated. Also, such a configuration allows for providing highly stable power supply conditions from the at least one electric storage device to the at least one ancillary light source, e.g. via a power conditioning circuit interposed between the at least one electric storage device and the at least one ancillary light source.

In an alternative embodiment, the at least one photovoltaic device is connected or connectable to the at least one ancillary light source for supplying energy generated by the at least one photovoltaic device directly to the at least one ancillary light source, i.e. without passing the electric energy through an electric storage device. In such a configuration the complexity and costs for providing an electric storage device may be saved. Further, the risk of malfunction due to a failure of the electric storage device is eliminated.

In a further alternative embodiment, the at least one photovoltaic device is coupled to the at least one electric storage device and to the at least one ancillary light source. In this way, power may be directly supplied to the at least one ancillary light source, when needed, and may be stored in the at least one electric storage device, when not needed or not fully needed by the at least one ancillary light source.

In an embodiment, the exterior aircraft light cover comprises a controller which is configured for switching and/or dimming the at least one ancillary light source. Such a controller allows operating the exterior aircraft light cover independently of the aircraft to which it is mounted. It allows in particular switching the at least one ancillary light source of the exterior aircraft light cover autonomously, i.e. without receiving electric control signals via an electric connection with the aircraft. Such a configuration facilitates an easy replacing of a conventional exterior aircraft light cover, which does not comprise any ancillary light sources, with an exterior aircraft light cover according to an exemplary embodiment of the invention. No electric control signals for switching the at least one ancillary light source of the exterior aircraft light cover need to be supplied from the aircraft and/or from the exterior aircraft light to the controller.

In an embodiment, the controller is configured for switching and/or dimming the at least one ancillary light source in response to at least one sensor signal received by the controller. Such a configuration allows switching and/or dimming the at least one ancillary light source of the exterior aircraft light cover in a well-controlled and autonomous manner. The at least one ancillary light source of the exterior aircraft light cover may for example be switched in response to a flight state of the aircraft indicated by the at least one sensor signal. Alternatively or additionally, the at least one ancillary light source of the exterior aircraft light cover may be switched in response to a switching state of the exterior aircraft light, indicated by the at least one sensor signal.

In an embodiment, the exterior aircraft light cover is equipped with at least one sensor, which is configured for supplying at least one sensor signal. The sensor signal may indicate a current flight state of the aircraft to the controller. The at least one sensor may in particular include at least one of a variometer and an accelerometer, indicating the current height or acceleration of the aircraft, respectively.

Alternatively or additionally, the at least one sensor may include a light sensor, which is configured for supplying a sensor signal, indicating the switching state of the at least one targeted light source of the exterior aircraft light, to which the exterior aircraft light cover is mounted.

In an embodiment, the exterior aircraft light cover comprises at least one first photovoltaic device and at least one second photovoltaic device, and the controller is configured for switching and/or dimming the at least one ancillary light source in response to the electric power/voltage provided by the at least one first photovoltaic device and the at least one second photovoltaic device, in particular in response to a difference between the electric power/voltage provided by the at least one first photovoltaic device and the at least one second photovoltaic device.

In such a configuration, the photovoltaic devices, which are provided for generating the electric energy used for operating the at least one ancillary light source, are additionally employed as light sensors for automatically switching and/or dimming the at least one ancillary light source. Using the photovoltaic devices as light sensors allows for automatically switching and/or dimming the at least one ancillary light source, without providing additional sensors.

In an embodiment, the first and second photovoltaic devices are spaced apart from each other. In other words, the first and second photovoltaic devices are arranged in different spatial areas of the exterior aircraft light cover, so that the at least two light photovoltaic devices may by illuminated with different light intensities. In such an embodiment, the controller may be configured for switching the at least one ancillary light source on if the at least one first photovoltaic device provides more electric power, in particular a higher voltage, than the at least one second photovoltaic device, and/or the controller may be configured for switching the at least one ancillary light source off if the at least one first photovoltaic device provides less electric power, in particular a lower voltage, than the at least one second photovoltaic device.

In such an embodiment, the at least one ancillary light source may be switched on and off based on the shape of the light distribution illuminating the photovoltaic devices, in particular based on the shape of the light distribution emitted by the at least one targeted light source of the exterior aircraft light.

The at least one ancillary light source of the exterior aircraft light cover may for example be switched on if a light pattern, emitted by the targeted light source(s) of the exterior aircraft light, causes the at least one first photovoltaic device to receive more light than the second photovoltaic device; and/or the at least one ancillary light source of the exterior aircraft light cover may be switched off if a light pattern, generated by the targeted light source(s) of the exterior aircraft light, causes the at least one first photovoltaic device to receive less light than the second photovoltaic device. With such a configuration, the at least one ancillary light source of the exterior aircraft light cover may be controlled, i.e. switched on and off, in dependence of the switching state of the exterior aircraft light, without providing an additional sensor(s) and without establishing any electrical connections between the exterior aircraft light cover and the exterior aircraft light.

For example, based on the light received by the at least one first photovoltaic device vs. the light received by the at least one second photovoltaic device, the controller may determine if the exterior aircraft light is operated as a take-off light or as a landing light and may switch the at least one ancillary light source on/off in accordance with said determination.

In an embodiment, the controller is further configured for controlling the charging and discharging of the electric storage device, in order to avoid an overcharging or undercharging of the electric storage device.

In an embodiment, the at least one ancillary light source is supported by at least one of the mounting portion and the light transmissive pane. When the at least one ancillary light source is supported by at least one of the mounting portion and the light transmissive pane, there is no need for providing an additional support structure, supporting the at least one light source. This simplifies the structure of the exterior aircraft light cover and reduces its manufacturing costs.

In an embodiment, the at least one ancillary light source of the exterior aircraft light cover is arranged at a periphery of the light transmissive pane. In an embodiment, the at least one ancillary light source includes a light strip, extending at least along a portion of the outer periphery of the light transmissive pane. The light strip may comprise a plurality of light sources, such as LEDs, arranged along the extension of the light strip. An ancillary light source extending along a portion of the outer periphery of the light transmissive pane may help with an easy and unambiguous identification of the exterior aircraft light. It may emphasize and may clearly indicate the shape of the outer periphery of the light transmissive pane.

In an embodiment, the exterior aircraft light cover comprises a support structure supporting at least one of the at least one photovoltaic device, the at least one electric storage device and the controller. The support structure may in particular include a hood extending over a portion of the light transmissive pane. The hood may be spaced apart from the light transmissive pane, so that there is a spatial distance/free space between the hood and the light transmissive pane. Such a configuration allows light from the at least one targeted light source of the exterior aircraft light to be emitted onto and through the portion of the light transmissive pane located under the hood.

Such a support structure provides a reliable mounting portion, to which the at least one photovoltaic device, the at least one electric storage device, and/or the controller may be mounted conveniently. A support structure with a hood, extending over a portion of the light transmissive pane, may allow for conveniently arranging the at least one photovoltaic device at a position in which it is illuminated by light, which is reflected by the light transmissive pane.

In an embodiment, the at least one electric storage device includes at least one supercapacitor. Supercapacitors provide efficient and reliable electric storage devices with a high energy density at comparatively low costs. Alternative types of electric storage device may be employed as well.

Exemplary embodiments of the invention also include an exterior aircraft light, comprising an exterior aircraft light housing, at least one targeted light source arranged within the exterior aircraft light housing, and an exterior aircraft light cover according to an exemplary embodiment of the invention. The additional features, modifications, and effects, as described above with respect to the exterior aircraft light cover, apply to the exterior aircraft light in an analogous manner. The at least one targeted light source may be supported by the exterior aircraft light housing, either directly or via a suitable support structure.

In an embodiment, the exterior aircraft light housing is a dedicated component mounted to the aircraft. In other words, the exterior aircraft light housing may be an originally separate, stand alone component that may be mounted to the aircraft body, the aircraft skin or any other suitable portion of the aircraft structure.

In an embodiment, the exterior aircraft light housing is provided as an opening or recess formed within the outer surface of the aircraft body.

The exterior aircraft light housing may be formed with an opening, facing the outside of the aircraft, for allowing access to the exterior aircraft light from outside the aircraft. An exterior aircraft light cover according to an exemplary embodiment of the invention may be configured for closing said opening, in order to protect the components, in particular the targeted light sources, of the exterior aircraft light from adverse environmental influences, such as mechanical impact, water, moisture, dirt, etc.

In an exterior aircraft light according to an exemplary embodiment of the invention, the at least one photovoltaic device is arranged at a position, in which it is illuminated by at least a portion of the light emitted by the at least one targeted light source. Said portion of the light emitted by the at least one targeted light source may reach the at least one photovoltaic device directly or after being reflected by the light transmissive pane. The at least one photovoltaic device may in particular be arranged on the same side of the light transmissive pane as the at least one targeted light source. In other words, the at least one photovoltaic device may be arranged inside the exterior aircraft light.

In an embodiment, the exterior aircraft light is configured to selectively operate as a landing light or as a take-off light. The exterior aircraft light cover may be configured for detecting at least a portion of the light emitted by the targeted light sources of the exterior aircraft light, in order to switch on the at least one ancillary light source of the exterior aircraft light cover, when the exterior aircraft light is operated as a landing light, and in order to switch off the at least one ancillary light source of the exterior aircraft light cover, when the exterior aircraft light is operated as a take-off light.

In further embodiments, the exterior aircraft light may be configured for being operated as at least one of a runway turn-off light and a taxi light.

In an embodiment, the exterior aircraft light is a multi-functional light, which may be selectively operated in different modes of operation. Said modes of operation may include at least one of a landing light operation mode, a take-off light operation mode, a runway turn-off light operation mode, and a taxi light operation mode, or any combinations thereof.

Exemplary embodiments of the invention further include an aircraft, such as an air plane or a rotorcraft, comprising at least one exterior aircraft light according to an exemplary embodiment of the invention. Exterior aircraft lights according to an exemplary embodiments of the invention may for example be mounted to a fuselage, to a landing gear, to a wing, to a vertical stabilizer and/or to a tailplane of an aircraft. The additional features, modifications, and effects, as described above with respect to the exterior aircraft light cover and the exterior aircraft light, apply to the aircraft in an analogous manner.

Exemplary embodiments of the invention further include a method of upgrading or maintaining an exterior aircraft light comprising an exterior aircraft light cover having a light transmissive pane, wherein the method includes: removing the exterior aircraft light cover from the exterior aircraft light and mounting an exterior aircraft light cover according to an exemplary embodiment of the invention to the exterior aircraft light.

Since an exterior aircraft light cover according to exemplary embodiments of the invention does not need to be connected with the electric system of the aircraft, a conventional exterior aircraft light cover, which does not comprise any ancillary light sources, may be replaced easily with an exterior aircraft light cover according to an exemplary embodiment of the invention without intervening with the electric system of the aircraft. As an exterior aircraft light cover according to an exemplary embodiment of the invention does not intervene with the electric system of the aircraft, the certification of an exterior aircraft light cover according to an exemplary embodiment of the invention for being used in commercial aviation is considerably simplified, as compared to the process of certifying a component which does intervene with the electric system of the aircraft.

In the following, exemplary embodiments of the invention are described with respect to the accompanying drawings, wherein:

FIG. 6 illustrates the operation of the exterior aircraft light, wherein the landing light sources are switched on; and FIG. 7 illustrates the operation of the exterior aircraft light, wherein the take-off light sources are switched on.

DETAILED DESCRIPTION

Figure 1:
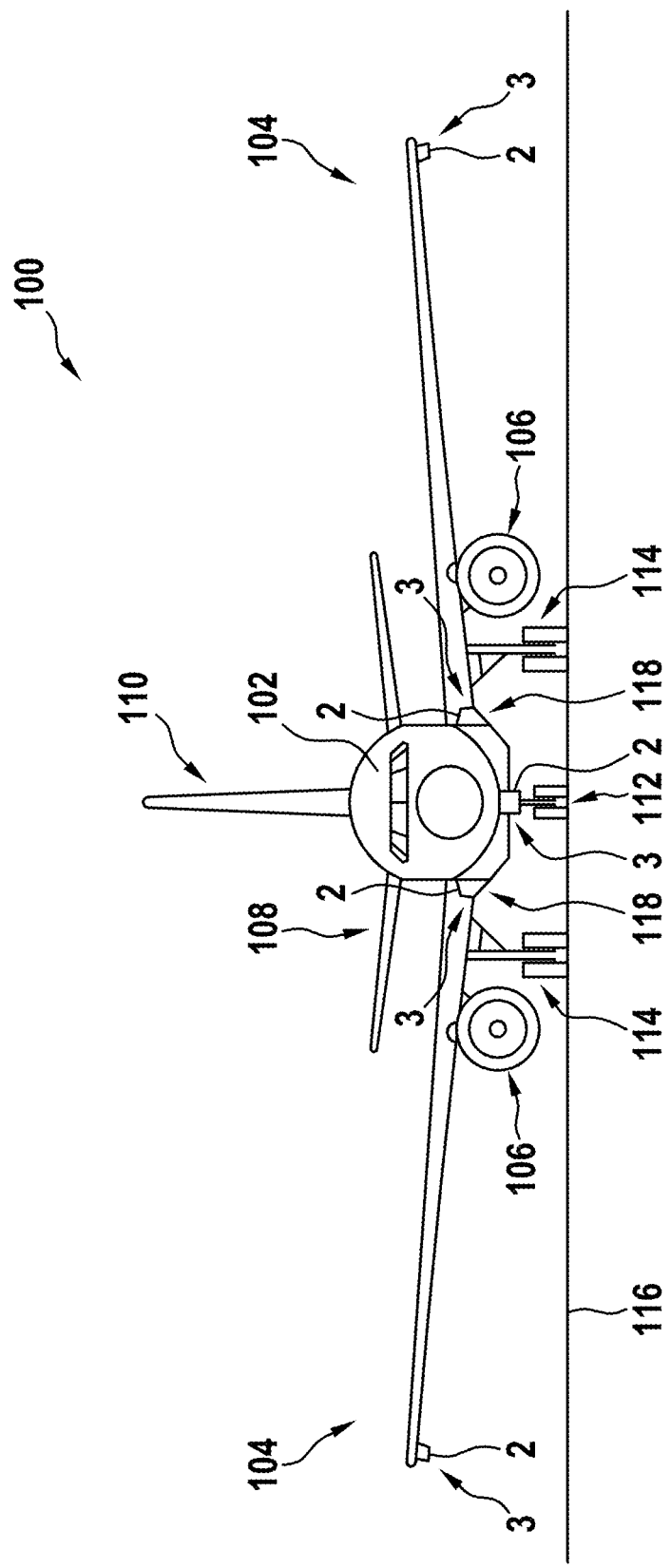
FIG. 1 depicts a schematic front view of an aircraft, in particular an air plane, equipped with exterior aircraft lights according to exemplary embodiments of the invention.

FIG. 1 depicts a schematic front view of an aircraft 100, in particular an air plane 100, comprising a fuselage 102, two wings 104, laterally extending from opposite sides of the fuselage 102, and two engines 106. Each of the engines 106 is mounted to one of the wings 104. The skilled person understands that the aircraft 100 may comprise more than two engines 106, in particular four engines 106.

A tailplane 108 and a vertical stabilizer 110 extend from an upper rear portion of the fuselage 102. The aircraft 100 further comprises a front gear 112 and a main gear 114, extending from the bottom of the fuselage 102 and supporting the aircraft 100 on the ground 116.

The aircraft 100 comprises a plurality of exterior aircraft lights 2, such as take-off lights, landing lights, taxi lights, navigation lights and anti-collision lights.

Exterior aircraft lights 2 may be provided at the gears 112, 114, in particular the front gear 112, at the fuselage 102, at the wings 104, at the tailplane 108 and/or at the vertical stabilizer 110 of the aircraft 100. Exterior aircraft lights 2 in particular may be mounted at or next to the wing roots 118, i.e. to the portions 118 of the aircraft 100 at which the wings 104 extend from the fuselage 102.

The positions of the exterior aircraft lights 2 depicted in FIG. 1 are only exemplary. The positions may vary depending on the type of the aircraft 100 as well as on the type of the respective exterior aircraft light 2.

Each of the exterior aircraft lights 2 comprises a housing 3. The housing 3 may be a dedicated component mounted to the aircraft 100. The housing 3 also may be provided as an opening or recess formed within the outer surface of the aircraft 100.

Figure 2:
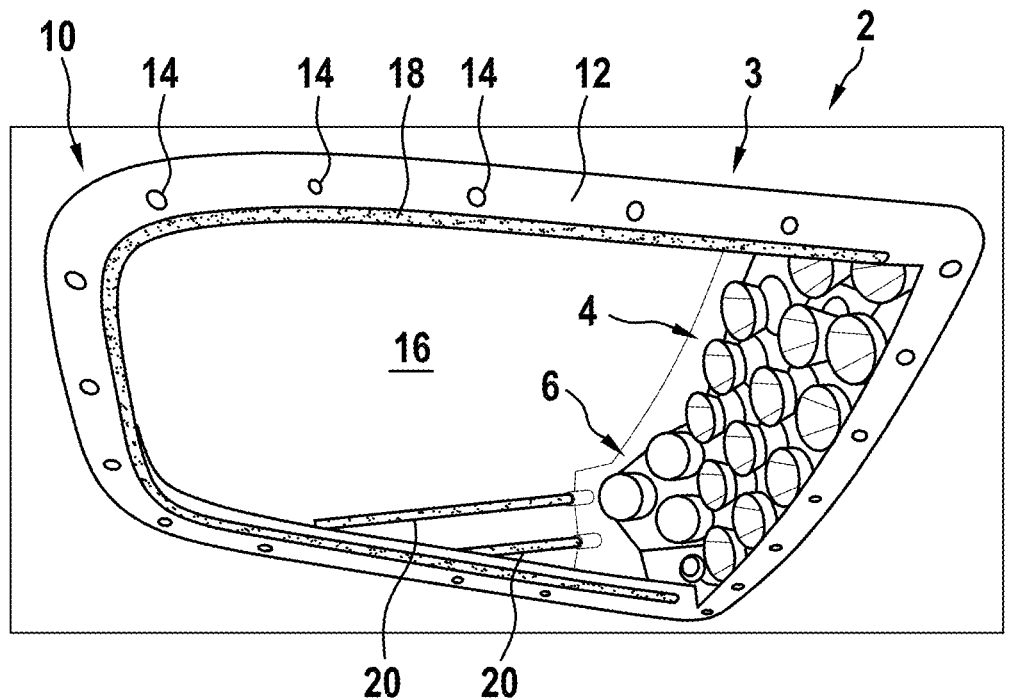
FIG. 2 depicts a perspective view of an exterior aircraft light according to an embodiment of the invention, comprising an exterior aircraft light cover according to an embodiment of the invention.

FIG. 2 depicts an exterior aircraft light 2 according to an exemplary embodiment of the invention, comprising an exterior aircraft light cover 10 according to an embodiment of the invention. The exterior aircraft light 2 is mounted to the aircraft 100, in particular to an exterior surface of the aircraft 100. In the embodiment depicted in FIG. 2, the housing 3 of the exterior aircraft light 2 is provided as an opening or recess formed within the outer surface of the aircraft 100

The exterior aircraft light 2, depicted in FIG. 2, is a multi functional runway light ("MFRL"), combining at least the functions of a take-off light and a landing light. The MFRL may further include the functions of a runway turn-off light and/or a taxi light.

The exterior aircraft light 2, depicted in FIG. 2, includes first targeted light sources 4, which, when operated, provide the functionality of a landing light, and second targeted light sources 6, which, when operated, provide the functionality of a take-off light. Thus, when the aircraft 100 is approaching the ground 116 for landing, the first targeted light sources 4 ("landing light sources 4") are switched on, and the second targeted light sources 6 ("take-off light sources 6") are switched off. In contrast, the first targeted light sources 4 ("landing light sources 4") are switched off and the second targeted light sources 6 ("take-off light sources 6") are switched on for take-off.

Although not explicitly shown in the figures, the exterior aircraft light 2 may further comprise additional targeted light sources, in order to allow operating the exterior aircraft light 2 as at least one of a runway turn-off light and a taxi light.

The exterior aircraft light cover 10 is mounted in front of the targeted light sources 4, 6. In other words, the exterior aircraft light cover 10 is arranged between the targeted light sources 4, 6 and the exterior environment of the aircraft 100.

Although the exterior aircraft light 2, depicted in FIG. 2, is a multi functional runway light ("MFRL"), the skilled person understands that an exterior aircraft light cover 10 according to exemplary embodiments of the invention may be employed in combination with other types of exterior aircraft lights 2 as well.

An exterior aircraft light cover 10 according to exemplary embodiments of the invention in particular may be employed in combination with exterior aircraft lights 2 providing only one function, e.g. the function of a take-off light, the function of a landing light, the function of a runway turn-off light or the function of a taxi light, respectively. It may also be employed in combination with exterior aircraft lights having more functions than the described MFRL.

The exterior aircraft light cover 10 comprises a mounting portion 12, extending along an outer periphery of the exterior aircraft light cover 10. The mounting portion 12 is configured to be mounted to the aircraft 100. The mounting portion 12 in particular is configured to be mounted to a housing 3 of an exterior aircraft light 2 ("exterior aircraft light housing 3"), e.g. by means of screws or bolts 14, extending through the mounting portion 12.

The exterior aircraft light cover 10 further comprises a light transmissive pane 16, supported by the mounting portion 12. The light transmissive pane 16 allows light, which is emitted by the targeted light sources 4, 6 of the exterior aircraft light 2, to pass through the exterior aircraft light cover 10.

The mounting portion 12 extends along the outer periphery of the light transmissive pane 16 and acts as a support portion/retainer, supporting the light transmissive pane 16.

In a first configuration, which is depicted in FIG. 2, the light transmissive pane 16 may be transmissive to light over substantially its whole spatial extension. In alternative configurations, which are not explicitly depicted in the figures, the light transmissive pane 16 may comprise light transmissive portions and opaque portions, which are not light transmissive. The light transmissive pane 16 may further comprise one or more colored light transmissive portions, in order to facilitate emitting an at least partially colored light distribution.

The light transmissive pane 16 or the light transmissive portions of the transmissive pane 16 may be at least partially transparent, in particular substantially fully transparent.

When mounted to the exterior surface of the aircraft 100, the light transmissive pane 16 and the mounting portion 12 jointly close the exterior aircraft light housing 3 on its outside, i.e. on the side facing the outside of the aircraft 100. As a result, the light transmissive pane 16 protects the targeted light sources 4, 6 from adverse ambient influences, such as mechanical impact, dirt, water, moisture, etc.

In the embodiment depicted in the figures, the light transmissive pane 16 has a basically trapezoidal contour with rounded edges. The contour of the light transmissive pane 16 depicted in the figures, however, is only exemplary and not limiting. The skilled person understands that other shapes of the contour of the light transmissive pane 16, as long as they are suitable for the desired functionality of the respective exterior aircraft light 2, are possible as well.

The exterior aircraft light cover 10 further comprises at least one ancillary light source 18, 20. The at least one ancillary light source 18, 20 may be mounted to and/or supported by the mounting portion 12 and/or to the light transmissive pane 16. In the non-limiting embodiment depicted in FIG. 2, an ancillary light source 18 is provided as a light strip 18 extending along the inner rim of the mounting portion 12, i.e. along the inner edge of the mounting portion 12 supporting the light transmissive pane 16.

The light emitted by the at least one ancillary light source 18, 20 does not significantly contribute or not contribute at all to the intended functionality of the exterior aircraft light 2, i.e. to the functionality of the exterior aircraft light 2 as a landing light and/or take-off light and/or runway turn-off light and/or taxi light. Instead, the desired functionality of the exterior aircraft light 2 is realized entirely or substantially entirely by the light emitted by the targeted light sources 4, 6 of the exterior aircraft light 2. In other words, the light emission from the targeted light sources 4, 6 is sufficient for satisfying the requirements of the intended functionality of the exterior aircraft light 2.

In the embodiment depicted in FIG. 2, the light strip constituting an ancillary light source 18 extends along three of the four sides of the trapezoidal shape of the light transmissive pane 16. This configuration of the ancillary light source 18, however, is only exemplary. In other embodiments of the present invention, which are not depicted in the figures, the at least one ancillary light source 18 may have a different configuration. The at least one ancillary light source 18 in particular may extend along a smaller or along a larger portion, in particular along fewer or more sides, of the outer periphery of the exterior aircraft light cover 10.

Additional ancillary light sources 20 may be provided on the inner side of the light transmissive pane 16, i.e. on the side of the light transmissive pane 16 facing the targeted light sources 4, 6 of the exterior aircraft light 2.

The ancillary light sources 18, 20 may include LEDs and/or other types of electrical light sources. The ancillary light sources 18, 20 may further include optical elements (not shown), such as lenses, prisms, reflectors etc., which are configured for shaping the light distribution emitted by the ancillary light sources 18, 20 into a desired pattern.

All ancillary light sources 18, 20 may be configured for emitting light having the same color. Alternatively, different ancillary light sources 18, 20 may be configured for emitting light of different colors. In particular, ancillary light sources 18, 20 of different colors may be employed at different exterior aircraft lights 2 of the aircraft 100, in order to help ground personnel to easily and reliably distinguish between the different exterior aircraft lights 2 based on the different colors of the light emitted by the respective ancillary light sources 18, 20.

Figure 3:
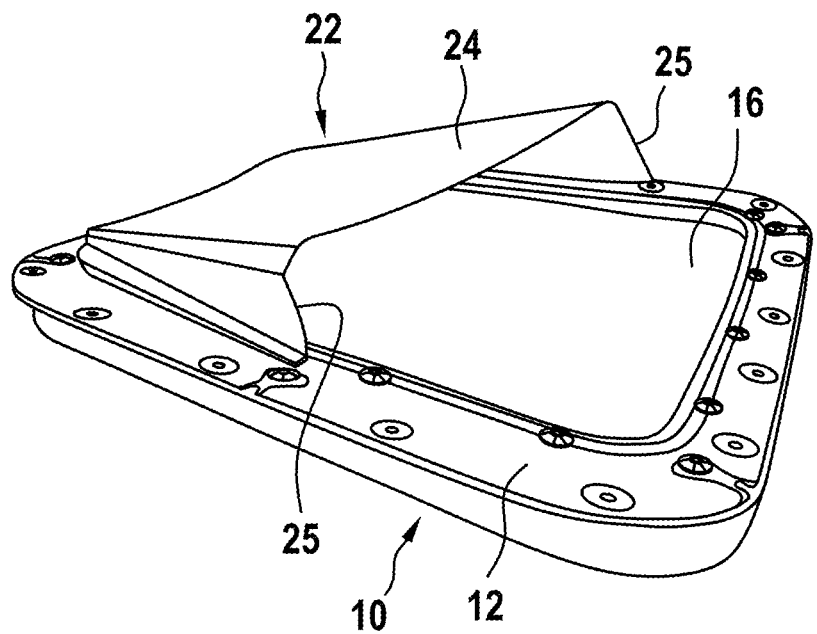
FIG. 3 depicts an exterior aircraft light cover according to an exemplary embodiment of the invention, separately from the exterior aircraft light, in a perspective view.

FIG. 3 depicts an exterior aircraft light cover 10 according to an exemplary embodiment of the invention in a configuration, in which it is separated/de-mounted from the exterior aircraft light 2. In consequence, the targeted light sources 4, 6, which are part of the exterior aircraft light 2, but do not belong to the exterior aircraft light cover 10, are not shown in FIG. 3.

In FIG. 3, the exterior aircraft light cover 10 is depicted from the side facing the interior of the aircraft 100, when the exterior aircraft light cover 10 is mounted to an exterior aircraft light 2. In other words, when compared to FIG. 2, the exterior aircraft light cover 10 is shown from the opposite side in FIG. 3.

In FIG. 3, the exterior aircraft light cover 10 is oriented such that the targeted light sources 4, 6 of the exterior aircraft light 2 are located on the right side of FIG. 3, when the exterior aircraft light cover 10 is mounted to an exterior aircraft light housing.

A hood 22 is provided at the left side of the exterior aircraft light cover 10, i.e. at the side of the exterior aircraft light cover 10 located opposite the targeted light sources 4, 6 of the exterior aircraft light 2, when the exterior aircraft light cover 10 is mounted to the exterior aircraft light 2.

The hood 22 is mounted to and supported by the mounting portion/retainer 12 of the exterior aircraft light cover 10. The hood 22, which in particular may be made from a non-transparent material, comprises an inclined plane 24, which is arranged at an arcuate angle with respect to the plane of the light transmissive pane 16. In alternative embodiments, which are not depicted in the figures, the plane 24 may be arranged substantially parallel to the plane of the light transmissive pane 16.

The hood 22 also comprises two side portions 25, extending between the inclined plane 24 and the mounting portion 12 and supporting the inclined plane 24.

The plane 24 is arranged in some distance from the light transmissive pane 16, forming a free space between the plane 24 and the light transmissive pane 16.

The free space defined by the hood 22 and the light transmissive pane 16 is open at the side facing the targeted light sources 4, 6 of the exterior aircraft light 2 (cf. FIG. 2), in order to allow light, which is emitted from said targeted light sources 4, 6, to enter into the free space and to pass through the portion of the light transmissive pane 16 located under the hood 22.

Figure 4:
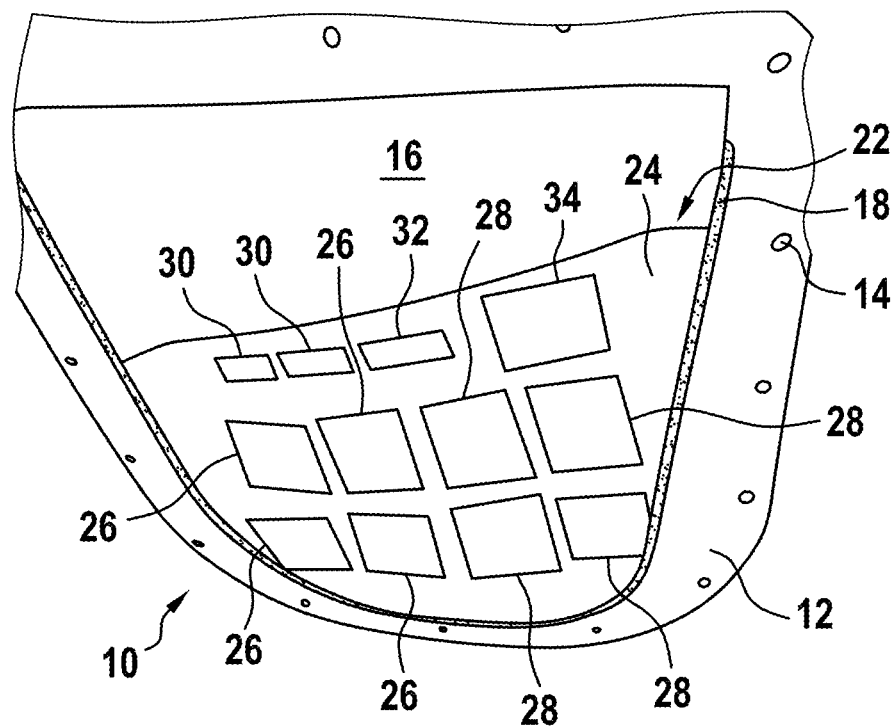
FIG. 4 depicts the exterior aircraft light cover, shown in FIG. 3, from the opposite side, also in a perspective view.

FIG. 4 depicts the exterior aircraft light cover 10, shown in FIG. 3, from the opposite side, i.e. from the side facing the outside of the aircraft, when the exterior aircraft light cover 10 is mounted to an exterior aircraft light 2/to an aircraft 100 (cf. FIG. 2).

FIG. 4 shows a plurality of electric components 26, 28, 30, 32, 34, mounted to the side of the inclined plane 24 of the hood 22 facing the light transmissive pane 16.

The electric components 26, 28, 30, 32, 34 mounted to the hood 22 include at least one photovoltaic device 26, 28, e.g. a solar cell, in particular a plurality of photovoltaic devices 26, 28. The at least one photovoltaic device 26, 28 is arranged at a position at which it is illuminated by the light emitted from the targeted light sources 4, 6 of the exterior aircraft light 2 and reflected, in particular due to Fresnel reflections, by the light transmissive pane 16 towards the at least one photovoltaic device 26, 28.

It is noted that for simplicity, the hood 22 and the electric components 26, 28, 30, 32, 34 are not depicted in FIG. 2.

Figure 5:
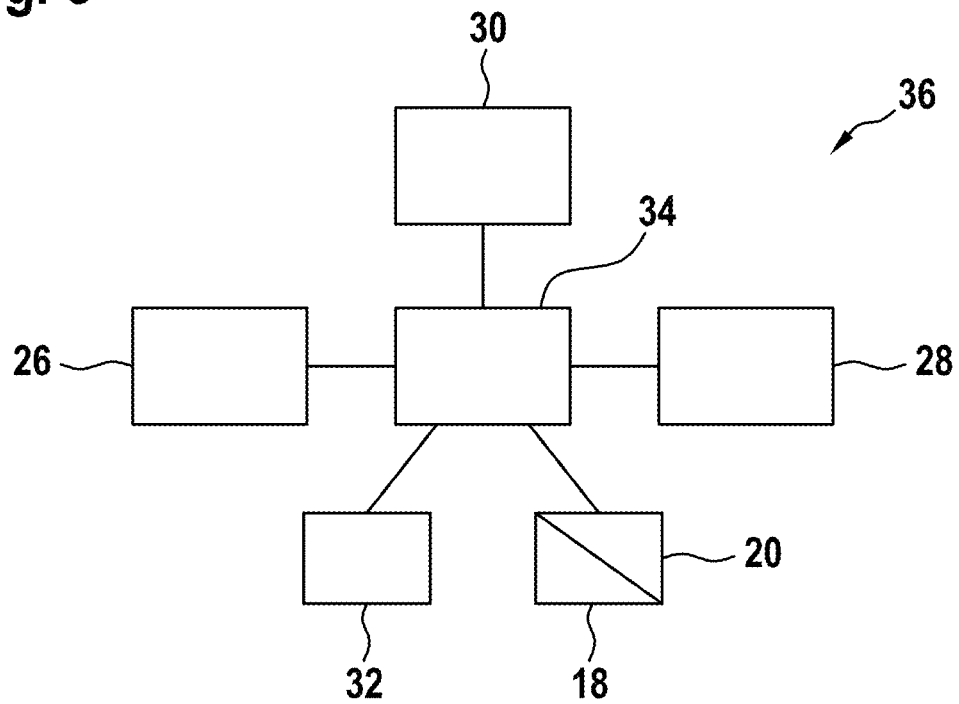
FIG. 5 depicts a block diagram of an electric circuit, as it may be employed in an exterior aircraft light cover according to an exemplary embodiment of the invention.

FIG. 5 shows a block diagram of an electric circuit 33, comprising the electric components 26, 28, 30, 32, 34 of the exterior aircraft light cover 10.

The plurality of photovoltaic devices 26, 28 include at least one first photovoltaic device 26, which is arranged at locations predominantly illuminated by light emitted by the landing light sources 4, and at least one second photovoltaic device 28, which is arranged at locations predominantly illuminated by light emitted by the take-off light sources 6.

The electric components 26, 28, 30, 32, 34, mounted to the hood 22, further comprise at least one electric storage device 30, for example at least one supercapacitor 30. The at least one electric storage device 30 is configured for storing at least a portion of the electric energy generated by the at least one photovoltaic device 26, 28 and selectively supplying said electric energy to the at least one ancillary light source 18, 20 for operating said at least one ancillary light source 18, 20. The at least one electric storage device 30 may in particular be configured to allow operating the at least one ancillary light source 18, 20 of the exterior aircraft light cover 10 for up to two hours, without the at least one photovoltaic device 26, 28 being illuminated.

The electric components 26, 28, 30, 32, 34 also include a controller 34, configured for switching and/or dimming the at least one ancillary light source 18, 20.

The controller 34 is electrically coupled to the photovoltaic devices 26, 28, the at least one electric storage device 30, the at least one ancillary light source 18, 20, and an (optional) sensor 32.

The controller 34 is configured for controlling the flow of electric energy between the photovoltaic devices 26, 28, the at least one electric storage device 30 and the at least one ancillary light source 18, 20.

The sensor 32 may comprise a variometer and/or an accelerometer, which is configured for detecting the height and/or the acceleration of the aircraft 100.

The sensor 32 and the controller 34 are operated with electric energy supplied by the photovoltaic devices 26, 28 and/or the at least one electric storage device 30 as well.

In the embodiment depicted in FIG. 4, the electric storage devices 30, the sensor 32 and the controller 34 are arranged on the side of the inclined plane 24 facing the light transmissive pane 16. The electric storage devices 30, the sensor 32 and/or the controller 34 may alternatively be mounted to the opposite side of the inclined plane 24, i.e. the side facing away from the light transmissive pane 16.

An exterior aircraft light cover 10 according to an exemplary embodiment, as it is depicted in FIGS. 2 to 5, is an exterior aircraft light cover 10 that allows for providing additional illumination of an exterior aircraft light 2.

The exterior aircraft light cover 10 is in particular operable, without establishing any electric connections between the exterior aircraft light cover 10 and the electric system of the aircraft 100. In consequence, a conventional transparent pane, covering the light sources of a conventional exterior aircraft light, may be replaced easily by an exterior aircraft light cover 10 according to an exemplary embodiment of the invention, without intervening with the electric system of the aircraft 100. As an exterior aircraft light cover 10 according to an exemplary embodiment of the invention does not intervene with the electric system of the aircraft 100, the process of certifying such an exterior aircraft light cover 10 for use in commercial aircraft is considerably simplified.

In the following, different possible modes of operating an exterior aircraft light cover 10 according to exemplary embodiments of the invention are described. In an exterior aircraft light cover 10 according to exemplary embodiments of the invention, one or more of these modes may be implemented.

For example, it may be desirable that the ancillary light sources 18, 20 of the exterior aircraft light cover 10 are switched on, when the aircraft 100 is approaching an airport, landing, and/or taxiing at said airport, and it may be desirable that the ancillary light sources 18, 20 of the exterior aircraft light cover 10 are switched off for take-off.

According to an exemplary embodiment of the invention, an automatic switching of the ancillary light sources 18, 20 for take-off and landing may be implemented by configuring the controller 34 to evaluate signals provided by a sensor 32. Said sensor 32 may in particular include a variometer and/or an accelerometer.

Based on a sensor signal provided by a variometer, the controller 34 is capable to determine whether the aircraft 100 is descending for landing and to switch on the ancillary light sources 18, 20 of the exterior aircraft light cover 10, when such a landing situation is detected.

From the signals provided by a variometer, the controller 34 is further capable to determine whether the aircraft 100 is ascending during take-off and to switch on the ancillary light sources 18, 20, when such a take-off situation is detected.

Alternatively or additionally, an accelerometer may be used for detecting whether the aircraft is in a take-off situation or in a landing situation.

For example, a sensor signal from an accelerometer, corresponding to a strong acceleration that extends at least over a predetermined amount of time, indicates that the aircraft 100 is taking-off, and a sensor signal, corresponding to a deceleration that extends at least over a predetermined amount of time, indicates that the aircraft 100 is in a landing approach.

Switching the ancillary light sources 18, 20 of the exterior aircraft light cover 10 based on signals provided by such a sensor 32 allows for a reliable switching of the ancillary light sources 18, 20 on and off, in particular in situations in which the operational state of the exterior aircraft light 2, to which the exterior aircraft light cover 10 is mounted, does not indicate whether the aircraft 100 is currently taking-off or landing.

When the mode of operation of the exterior aircraft light 2 indicates whether the aircraft 100 is currently taking-off or landing, the light emitted by the targeted light sources 4, 6 of the exterior aircraft light 2 may be used as an indicator for determining whether the ancillary light sources 18, 20 of the exterior aircraft light cover 10 are to be switched on or off.

Figure 6:
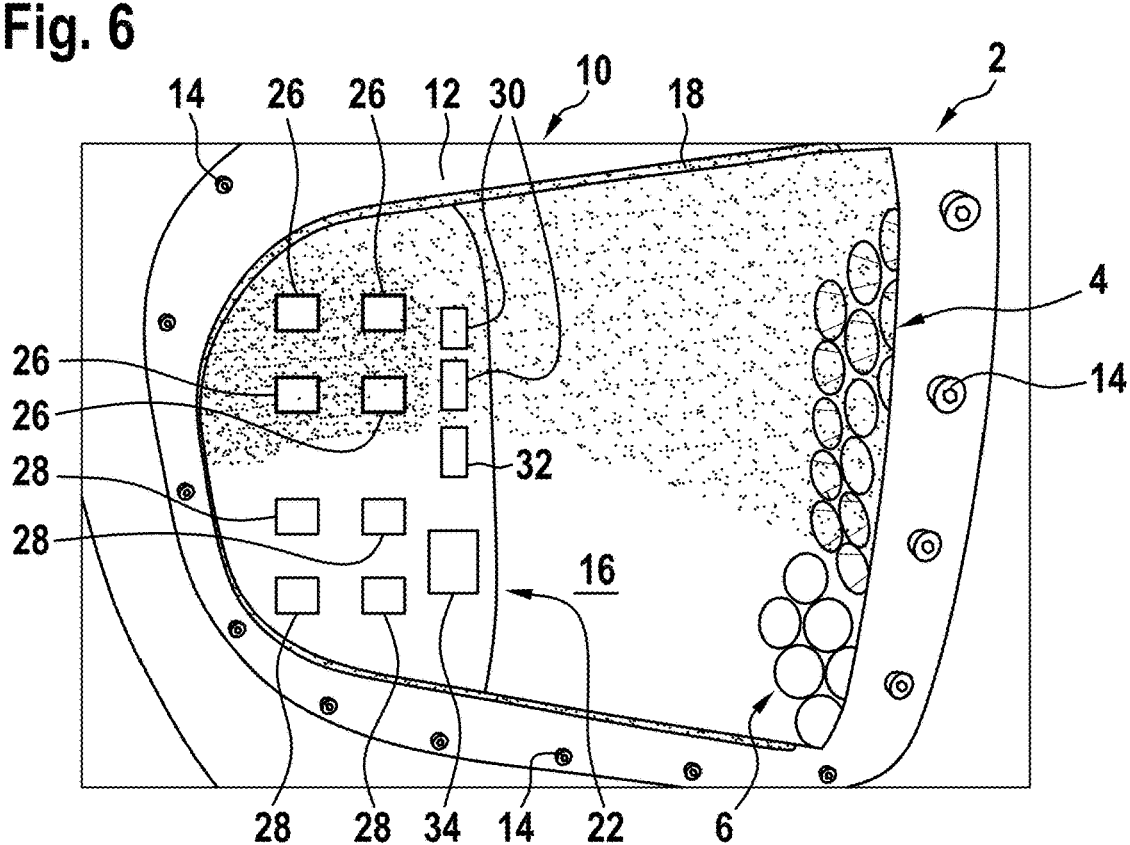
Figure 7:
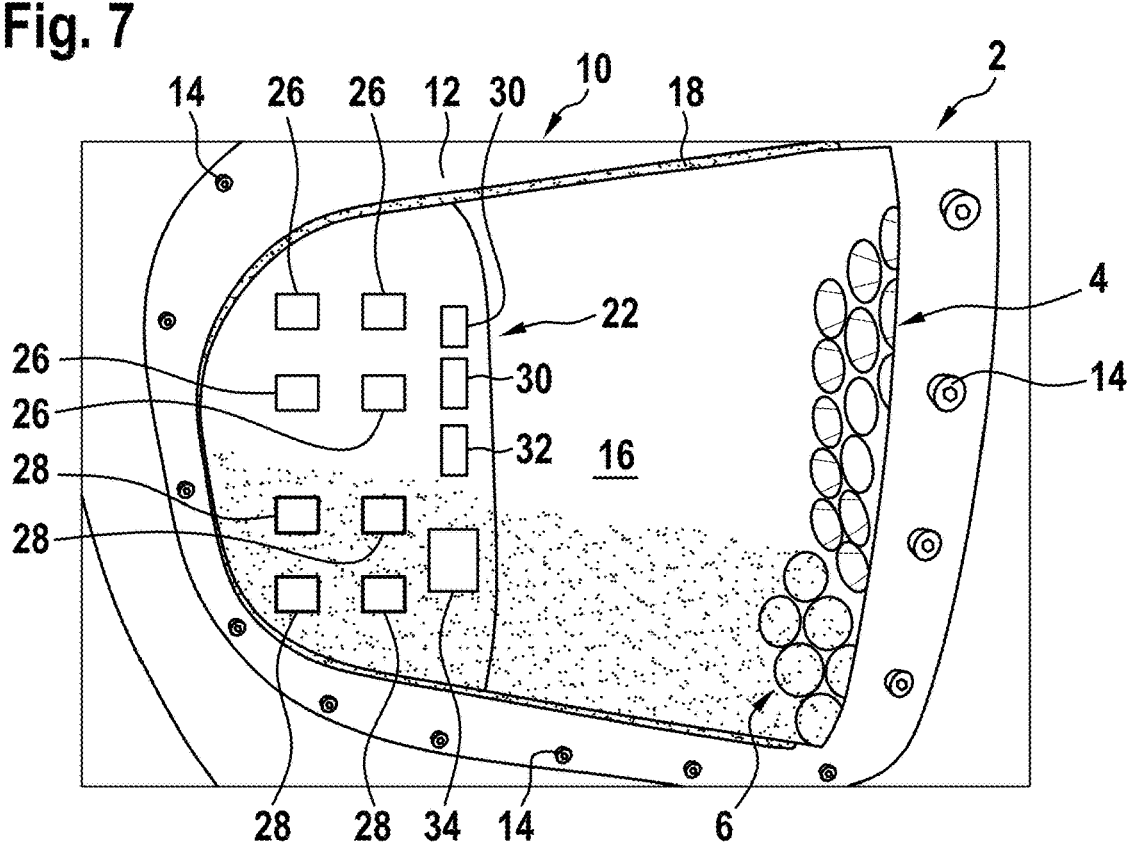

In the following, a method of using the light emitted by the targeted light sources 4, 6 of the exterior aircraft light 2 as an indicator for determining whether the ancillary light sources 18, 20 of the exterior aircraft light cover 10 are to be switched on or off is described with reference to FIGS. 6 and 7. FIGS. 6 and 7 show the exterior aircraft light 2, depicted in FIG. 2, in different operational states.

FIG. 6 illustrates the operation of the exterior aircraft light 2 in a landing situation, in which the landing light sources 4 are switched on, and the take-off light sources 6 are switched off. FIG. 6 shows that in a landing situation, in which the landing light sources 4 are switched on, more light is reflected by the light transmissive pane 16 onto the first photovoltaic device 26 than onto the second photovoltaic device 28.

FIG. 7 illustrates the operation of the exterior aircraft light 2 during take-off. During take-off, the landing light sources 4 are switched off, and the take-off light sources 6 are switched on. FIG. 7 shows that during take-off, when the take-off light sources 6 are switched on, more light is reflected by the light transmissive pane 16 onto the second photovoltaic device 28 than onto the first photovoltaic device 26.

In a configuration as it is depicted in FIGS. 6 and 7, the photovoltaic devices 26, 28 are not only configured to be used as energy generating components for providing the electric energy, which is used for operating various components of the exterior aircraft light cover 10. The photovoltaic devices 26, 28 are additionally employed as light detectors for detecting the operational states of the landing light sources 4 and the take-off light sources 6, respectively. As the landing light sources 4 and the take-off light sources 6 are not switched on simultaneously, detecting the operational states of the landing light sources 4 and the take-off light sources 6 may in particular include comparing the energies/voltages, supplied by the first and second photovoltaic devices 26, 28, with each other.

By comparing the electric energies/voltages, supplied by the first and second photovoltaic devices 26, 28, with each other, the controller 34 may determine that only the landing light sources 4 are switched on. This indicates that the aircraft 100 is currently in a landing approach. In consequence, the controller 34 activates the ancillary light sources 18, 20 of the exterior aircraft light cover 10.

Similarly, by comparing the energies/voltages, supplied by the first and second photovoltaic devices 26, 28, with each other, the controller 34 may determine that only the take-off light sources 6 are switched on. This indicates that the aircraft 100 is preparing for take-off. In consequence, the ancillary light sources 18, 20 of the exterior aircraft light cover 10 are switched off by the controller 34.

In an embodiment, in which the ancillary light sources 18, 20 of the exterior aircraft light cover 10 are switched on and off based on detected light, emitted by the landing light sources 4 and the take-off light sources 6 of the exterior aircraft light 2 and then reflected by the light transmissive pane 16 towards the photovoltaic devices 26, 28, the additional sensor 32, such as a variometer or an accelerometer, may be saved. This may allow for reducing the complexity and/or cost of the exterior aircraft light cover 10.

While the invention has been described with reference to exemplary embodiments, it will be understood by those skilled in the art that various changes may be made and equivalence may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:

1. An exterior aircraft light cover with integrated illumination, comprising:
    a mounting portion, configured to be mounted to an exterior aircraft light housing;
    a light transmissive pane, supported by the mounting portion, wherein the mounting portion and the light transmissive pane are configured to jointly close the exterior aircraft light housing;
    at least one photovoltaic device, which is configured for generating electric energy when illuminated;
    at least one electric storage device, which is configured for storing at least a portion of the electric energy generated by the at least one photovoltaic device; and
    at least one ancillary light source, which is operable with electric energy supplied by at least one of the at least one photovoltaic device and the at least one electric storage device.

2. The exterior aircraft light cover according to claim 1, wherein the exterior aircraft light housing is a dedicated component or a recess formed in a body of an aircraft.

3. The exterior aircraft light cover according to claim 1, further comprising:
    a controller configured for switching \or dimming the at least one ancillary light source,
    wherein the controller is configured for switching or dimming the at least one ancillary light source in response to a sensor signal received by the controller.

4. The exterior aircraft light cover according to claim 3, further comprising:

a sensor that is one of a light sensor, a variometer or an accelerometer, wherein the sensor is configured for supplying a sensor signal to the controller.

5. The exterior aircraft light cover according to claim 4, comprising at least one first photovoltaic device and at least one second photovoltaic device, wherein the controller is configured for switching and/or dimming the at least one ancillary light source in response to the electric power provided by the at least one first photovoltaic device and the at least one second photovoltaic device, in particular in response to a difference between the electric power provided by the at least one first photovoltaic device and the at least one second photovoltaic device.

6. The exterior aircraft light cover according to claim 5, wherein the controller is configured for switching the at least one ancillary light source on if the at least one first photovoltaic device provides more electric power than the at least one second photovoltaic device, and/or wherein the controller is configured for switching the at least one ancillary light source off if the at least one first photovoltaic device provides less electric power than the at least one second photovoltaic device.

7. The exterior aircraft light cover according to claim 1, wherein the at least one ancillary light source is supported by at least one of the mounting portion and the light transmissive pane.

8. The exterior aircraft light cover according to claim 1, wherein the at least one ancillary light source is arranged at a periphery of the light transmissive pane, wherein the at least one ancillary light source in particular includes a light strip that extends at least along a portion of the periphery of the light transmissive pane.

9. The exterior aircraft light cover according to claim 1, further comprising a support structure, supporting at least one of the at least one photovoltaic device, the at least one electric storage device and the controller.

10. The exterior aircraft light cover according to claim 9, wherein the support structure includes a hood extending over a portion of the light transmissive pane, wherein the hood is in particular spaced apart from the light transmissive pane.

11. The exterior aircraft light cover according to claim 1, wherein the at least one electric storage device includes at least one supercapacitor.

12. An exterior aircraft light, comprising:
an exterior aircraft light housing;
at least one targeted light source, supported by the exterior aircraft light housing; and
an exterior aircraft light cover according to claim 1.

13. An exterior aircraft light, comprising:
an exterior aircraft light housing;
at least one targeted light source, supported by the exterior aircraft light housing; and
an exterior aircraft light cover that comprises:
a mounting portion, configured to be mounted to an exterior aircraft light housing;
a light transmissive pane, supported by the mounting portion, wherein the mounting portion and the light transmissive pane are configured to jointly close the exterior aircraft light housing;
at least one photovoltaic device, which is configured for generating electric energy when illuminated;
at least one electric storage device, which is configured for storing at least a portion of the electric energy generated by the at least one photovoltaic device; and
at least one ancillary light source, which is operable with electric energy supplied by at least one of the at least one photovoltaic device and the at least one electric storage device
wherein the exterior aircraft light is configured to selectively operate as a landing light or as a take-off light, wherein the exterior aircraft light cover is configured to detect at least a portion of the light emitted by the exterior aircraft light in order to switch on the at least one ancillary light source when the exterior aircraft light is operating as a landing light, and to switch off the at least one ancillary light source when the exterior aircraft light is operating as a take-off light.

14. An aircraft comprising at least one exterior aircraft light according to claim 12.

15. A method of upgrading or maintaining an exterior aircraft light comprising an exterior aircraft light cover having a light transmissive pane, wherein the method includes:
removing the exterior aircraft light cover from the exterior aircraft light; and
mounting an exterior aircraft light cover according to claim 1 to the exterior aircraft light.

16. The exterior aircraft light cover according to claim 1, wherein the at least one photovoltaic device is arranged in a position, in which it is illuminated by light, which is reflected by the light transmissive pane towards the at least one photovoltaic device.

17. The exterior aircraft light according to claim 12, wherein the at least one photovoltaic device is arranged in a position, in which it is illuminated by light which is emitted by the at least one targeted light source of the exterior aircraft light and reflected by the light transmissive pane towards the at least one photovoltaic device.

\* \* \* \* \*